(12) United States Patent
Benco et al.

(10) Patent No.: US 7,587,473 B2
(45) Date of Patent: Sep. 8, 2009

(54) NETWORK SUPPORT FOR RECONFIGURATION OF SUBSCRIBER MOBILE CONFIGURATION DATA

(75) Inventors: David S. Benco, Winfield, IL (US); David H. Blackmore, Mckena, IL (US); Sandra L. True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 873 days.

(21) Appl. No.: 10/687,456

(22) Filed: Oct. 16, 2003

(65) Prior Publication Data

US 2005/0085225 A1    Apr. 21, 2005

(51) Int. Cl.
*G06F 15/177* (2006.01)
(52) U.S. Cl. .................. 709/220; 709/202; 709/221; 709/222
(58) Field of Classification Search .................. 709/223
See application file for complete search history.

(56) References Cited

U.S. PATENT DOCUMENTS

| 6,853,714 B2* | 2/2005 | Liljestrand et al. ...... 379/201.03 |
| 2002/0107920 A1* | 8/2002 | Hotti ......................... 709/204 |
| 2003/0046433 A1* | 3/2003 | Luzzatti et al. ............. 709/248 |
| 2003/0236874 A1* | 12/2003 | Hotti ......................... 709/224 |
| 2004/0024795 A1* | 2/2004 | Hind et al. .................. 707/204 |
| 2004/0142711 A1* | 7/2004 | Mahonen et al. ............ 455/502 |
| 2005/0059393 A1* | 3/2005 | Knowles .................. 455/432.3 |

* cited by examiner

*Primary Examiner*—Larry D Donaghue
*Assistant Examiner*—Nicholas Taylor

(57) ABSTRACT

In general terms the system and method is for providing network support for reconfiguration of mobile configuration data for a mobile station. In one embodiment the method may have the steps of: storing mobile configuration data for a mobile station in a mobile subscriber database in the mobile station; storing the mobile configuration data in a network subscriber database in the network; changing via a user interface the mobile configuration data in the network subscriber database; and synchronizing, in response to the changing of the mobile configuration data in the network subscriber database, the mobile configuration data in the mobile subscriber database with the mobile configuration data in the network subscriber database of the mobile station.

14 Claims, 3 Drawing Sheets

NETWORK SUPPORT FOR RECONFIGURATION OF SUBSCRIBER MOBILE CONFIGURATION DATA

TECHNICAL FIELD

The present invention relates to wireless telephony in general, and, more particularly, to embodiments of a method and system that provide for providing network support for reconfiguration of mobile configuration data for a mobile station.

BACKGROUND OF THE INVENTION

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Regardless of the modulation scheme in use, the wireless phone available to the end user has myriad features implemented. Nearly all wireless phones incorporate a display that allows the user to enter text banners, display dialed numbers, and display incoming caller numbers. Additionally, wireless phones may incorporate electronic phonebooks, speed dialing, single button voicemail access, and messaging capabilities.

The features described above present only a sample of features that are capable of, or have already been, implemented into wireless phone systems. Any individual feature is capable of implementation into some or all of the wireless systems using the modulation schemes mentioned above. A particularly useful feature provides messaging capability within phones. The Short Message Services (SMS) feature used in a CDMA wireless communication system allows for information transfer to and from a wireless phone. However, the implementation of SMS is not limited to use in a CDMA system. The description of SMS in a CDMA system is merely provided as a foundation for the discussion of the preferred embodiment of the invention presented below. Short Message Services (SMS) are used to allow the communication of alphanumeric messages to wireless phones.

However, the multitude of features available on any particular wireless communication system presents problems to the service provider. The service provider may not choose to initially enable all features. The service provider may also choose to implement new features as they are developed. Subscriber units are initialized with features matching those offered by the service provider even though the phone may be capable of supporting additional features. Unfortunately, when the service provider activates new features, the phone must be manually updated to activate the additional feature. The manual update is either performed by requiring the user to return the subscriber unit to the service provider for update or by instructing the user to activate the feature through a series of keypad entries. Requiring the user to return the subscriber unit to the service provider for update is extremely inconvenient to the user and may result in many phones not having the feature activated. Similar problems exist when requiring the user to activate the feature through keypad entries. The user is instructed in how to access a protected service menu within the phone software and is provided directions in how to activate the feature. The user may never receive the instructions or, if the user is technologically unsophisticated, may be hesitant to attempt to activate the feature.

A problem arises when changes need to be made to the parameters. Changes may be required due to a customer request or a change in the service providers network. A change to the service providers network may include activating or deactivating specific services available to a particular paging receiver to add or delete a service, respectively, available to the receiver. Furthermore, a change may include deactivating the entire unit. Furthermore, specific functions of the paging receiver may be enabled or disabled through the use of programming.

In order to reprogram a paging receiver, a paging receiver typically must be returned to the service provider or manufacturer for reconfiguration. This usually entails packaging the paging receiver and sending it to a specific location. This can be very cumbersome and costly. Once at the location, a serial port connection is normally hooked to the paging receiver to facilitate the programming.

In the prior art, paging receivers have been programmed over the air. Such programming involves patching values into specific memory locations. This resulted in a large burden on the service provider. This is a burden because for each paging device supported by the service provider, there is an associated "memory map" for the data values that can be altered. This memory map must be retained by the service provider and used in the creation of the programming message for each device that uses this prior art over-the-air programming method. To add an address, for example, the service provider is required to determine the specific memory location(s) within the paging device that must be changed (from the memory map for that device) and include that information in the programming message sent to the pager. It is desirable to allow for over the air programming of a paging receiver to avoid the cost and hassle of sending the paging receiver into some predetermined location while also reducing the burden placed on the service provider.

Manufacturers and service providers desire a level of security when it comes to programming a paging receiver. Manufacturers and service providers want to prevent any average sender from sending messages that look like a programming message to devices. In this manner, the manufacturer and service providers are able to avoid unauthorized changes to the paging receiver.

Known in the prior art is software to sync up PDA (personal digital assistant) address books and phone address books with PC-based applications. There is software to download new ring tones from a service provider's website to a mobile handset. Mobile handsets are known to provide levels of menus to guide users through the provisioning of subscriber specific information. Also, OTAP (over the air provisioning) standards exist to initially activate/provision mobile handsets, but are not used to provide bidirectional transfer or periodic transfer of subscriber configuration data.

It is a very cumbersome task to navigate through each and every menu option on a mobile handset to initialize or change subscriber-specific data. Unfortunately many people attempt this task while driving, for example, which further complicates the task and increases the possibility of unsafe driving or an automobile accident.

It is often desirable to purchase a new model of a mobile phone, but the thought of having to reenter all of the contacts into the new phone is overwhelming. Worse yet, a lost phone means the necessity of programming into a new phone all menu options and contacts.

There is a need in the art to alleviate these error-prone and very time consuming and tedious tasks for a mobile user by making the sophisticated network support these every day functions.

There is also a need for systems that overcome the problem of mobile subscribers who are not aware of new features that may be introduced/added in their service provider's network. Many subscribers may only become aware of new features if they go to their service provider's store or some sales representative calls them for regarding a new feature.

SUMMARY

The following summary of some embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms the system and method is for providing network support for reconfiguration of mobile configuration data for a mobile station. In one embodiment the method may have the steps of: storing mobile configuration data for a mobile station in a mobile subscriber database in the mobile station; storing the mobile configuration data in a network subscriber database in the network; changing via a user interface the mobile configuration data in the network subscriber database; and synchronizing, in response to the changing of the mobile configuration data in the network subscriber database, the mobile configuration data in the mobile subscriber database with the mobile configuration data in the network subscriber database of the mobile station.

In general terms an embodiment of the system for providing network support for reconfiguration of mobile configuration data for a mobile station may have the following elements: a mobile subscriber database in a mobile station, and mobile configuration data stored in the a mobile subscriber database in a mobile station; a network subscriber database in the network, and a master copy of the mobile configuration data stored in the network subscriber database in the network; a user interface operatively connected to the network, the mobile configuration data in the network subscriber database being changeable via the user interface; and a synchronizing system in the network, the synchronizing system effecting, in response to a change of the mobile configuration data in the network subscriber database, a synchronization of the mobile configuration data in the mobile subscriber database with the mobile configuration data in the network subscriber database of the mobile station.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

Figure 1:
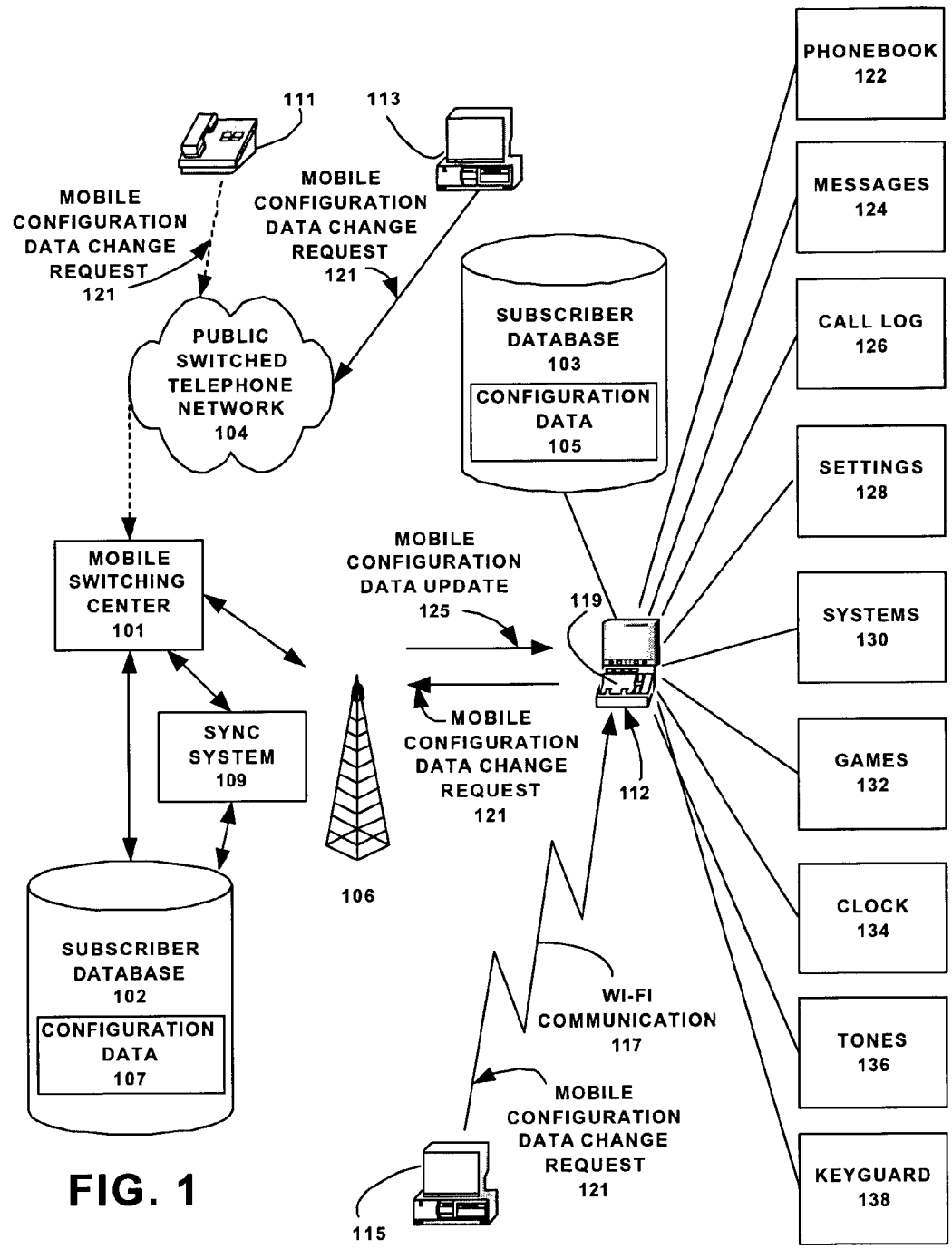
FIG. 1 depicts a block diagram illustrative of one embodiment of the present system.

The particular values and configurations discussed in these non-limiting examples can be varied and are cited merely to illustrate an embodiment of the present invention and are not intended to limit the scope of the invention.

Embodiments of the present system and method provide network infrastructure support for reconfiguring mobile configuration data both autonomously and upon subscriber request from a plurality of venues.

The present system and method alleviates error-prone and very time consuming and tedious tasks for a mobile user by making the sophisticated network support these every day functions. This network feature provides support for the modification and reliable storage of mobile configuration data in the network subscriber database. This data can then be manipulated via: a conversant voice system, a web-based graphical user interface (GUI) application over the Internet, a PC-based application using a Wi-Fi link with the mobile station, and directly from the mobile station itself.

In at least one embodiment these changes to mobile configuration data, regardless of user interface, cause the new mobile configuration data to be updated in the network subscriber database and then be downloaded to the mobile subscriber's handset (mobile station) if the data was updated via user interfaces, such as a conversant voice system or a web-based GUI application over the Internet.

Alternatively, a PC-based application could locally reconfigure the data directly on a mobile station, such as a cell phone. The mobile station may send this new configuration data to the network subscriber database for storage as described below.

A methodology of the present system and method is for supporting the upload of mobile parameter data to a network subscriber database based on a user-initiated request from a conversant voice system, a web-based application, or a mobile handset. This may include the ability to change the mobile parameter data while stored in the network subscriber database through an easy-to-use web interface over the Internet, through a conversant telephone system, or via Wi-Fi communication with the mobile handset itself.

A further methodology of the present system and method is for supporting the automatic download of mobile configuration data stored in a network subscriber database to a mobile handset. Also, methodologies of the present system and method are for specifying automatic periodic upload or download synchronization sessions between the network subscriber stored data and the mobile configuration data.

In one embodiment of the present method a mobile subscriber may initiate changes to mobile configuration data in the network subscriber database through a conversant voice system, a web site, or a Wi-Fi interface to a mobile handset. Anytime a change to the mobile configuration data is received, the network may automatically initiate a synchronization of the mobile configuration data with the appropriate subscriber's mobile configuration data in their handset. Additionally, a subscriber could, at anytime, request a sync of the data directly from their mobile handset.

Another option associated with this network-based feature is the option to set up periodic uploads from the mobile to the network or downloads from the network to the mobile of the mobile configuration data.

The network is the focus of mobile data storage and mobile data synchronization events. Also, the network is the place where the master copy of the mobile data is stored. As mentioned above subscriber-specific data may be updated from a variety of different venues: a conversant telephone system, a web-application, or via a Wi-Fi link with the mobile itself.

An advantage of the present system and method is that service providers may charge mobile subscribers a monthly fee for this service or may charge on a per sync request basis in order to earn additional revenues. The fee would cover the cost of storage of data and the cost involved to respond to sync requests.

Reference is now made to FIG. 1 wherein there is shown an exemplary wireless network 100. A public switched telephone network (PSTN) 104 is operatively connected to a mobile switching center (MSC) 101. The MSC 101 is in communication with at least one base station 106. The base station 106 is the physical equipment, illustrated for simplicity as a radio tower, which provides radio coverage to the geographical part of a cell for which it is responsible. The base station 106 may be in communication with mobile stations, such as mobile station 112 (also referred to as a mobile subscriber).

With further reference to FIG. 1, a subscriber database 102 may contain a home location register, which is a database maintaining and storing subscriber information such as subscriber profiles, current location information, international mobile subscriber Identity numbers, and other administrative information. The subscriber services associated with the mobile station 112 are defined in a subscriber profile that may be stored in the home location register in the subscriber database 102. The home location register may be co-located with a given MSC 101, integrated with the MSC 101, or alternatively service multiple MSCs. The subscriber database may also include a visitor location register that has information about all of the mobile stations currently located within an area of the base station 106 and areas of other base stations connected to MSC 101.

The mobile station 112 may consist of the mobile equipment (the terminal) and a smart card called the subscriber identity module (SIM). The SIM provides personal mobility, so that the user can have access to subscribed services irrespective of a specific terminal. By inserting the SIM card into another GSM terminal, the user is able to receive calls at that terminal, make calls from that terminal, and receive other subscribed services.

The mobile equipment is uniquely identified by the international mobile equipment identity (IMEI). The SIM card contains the international mobile subscriber identity (IMSI) used to identify the subscriber to the system, a secret key for authentication, and other information. The IMFI and the IMSI are independent, thereby allowing personal mobility. The SIM card may be protected against unauthorized use by a password or personal identity number.

The base station 106 may be composed of two parts, the base transceiver station (BTS) and the base station controller (BSC). These communicate across the standardized Abis interface, allowing (as in the rest of the system) operation between components made by different suppliers.

The base transceiver station houses the radio tranceivers that define a cell and handles the radio-link protocols with the mobile station. The base station controller manages the radio resources for one or more base transceiver stations. It handles radio-channel setup, frequency hopping, and handovers, as described below. The base station controller is the connection between the mobile station 112 and the mobile switching center 101 (MSC).

The mobile switching center 101 (MSC) acts like a normal switching node of the PSTN 104 or ISDN (not shown), and additionally provides all the functionality needed to handle a mobile subscriber 112, such as registration, authentication, location updating, handovers, and call routing to a roaming subscriber. These services are provided in conjunction with several functional entities.

The home location register (HLR) and visitor location register (VLR) in the subscriber database 102, together with the MSC 101, provide the call-routing and roaming capabilities of system. The HLR contains all the administrative information of each subscriber registered in the corresponding network, along with the current location of the mobile subscriber 112. The location of the mobile subscriber 112 is typically in the form of the signaling address of the VLR associated with the mobile station 112.

The visitor location register (VLR) in the subscriber database 102, contains selected administrative information from the HLR, necessary for call control and provision of the subscribed services, for each mobile station 112 currently located in the geographical area controlled by the VLR. Although each functional entity can be implemented as an independent unit, all manufacturers of switching equipment to date implement the VLR together with the MSC 101, so that the geographical area controlled by the MSC 101 corresponds to that controlled by the VLR, thus simplifying the signaling required. Note that the MSC 101 contains no information about particular mobile stations, which information is stored in the location registers.

As depicted in FIG. 1, this embodiment of the system for providing network support for reconfiguration of mobile configuration data for a mobile station may have the following elements: a mobile subscriber database 103 in a mobile station 112, and mobile configuration data 105 stored in the mobile subscriber database 103 in a mobile station 112; a network subscriber database 102 in the network 100, and a master copy of the mobile configuration data 107 stored in the network subscriber database 102 in the network 100; a user interface 111, 113, 115, 119 operatively connected to the network 100, the mobile configuration data 107 in the network subscriber database 102 being changeable via the user interface 111, 113, 115, 119; and a synchronizing system 109 in the network 100, the synchronizing system 109 effecting, in response to a change of the mobile configuration data 107 in the network subscriber database 102, a synchronization of the mobile configuration data 105 in the mobile subscriber database 103 of the mobile station 112 with the mobile configuration data 107 in the network subscriber database 102.

The user interface may at least one of: a conversant voice system 111, a web-based graphical user interface application over the Internet 113, a computer-based application 115 using a predetermined link 117 to the mobile station 112, and direct input 119 to the mobile station 112. The change of the mobile configuration data 107 in the network subscriber database 102 may be initiated by a mobile configuration data change request 121 from any one of a number of subscriber interfaces 111, 113, 115, 119 as depicted in FIG. 1. The mobile configuration data may comprise at least one of, for example, phone book 122, messages 124, call log 126, settings 128, systems 130, games 132, clock 134, tones 136, and keyguard 138. Upon synchronization, the mobile configuration data 105 is updated by mobile configuration data update 125.

The synchronizing of the mobile configuration data 107 in the network subscriber database 102 with the mobile configuration data 105 in the mobile subscriber database 103 of the mobile station 112, in one embodiment, may be performed automatically upon occurrence of the changing of the mobile configuration data 107 in the network subscriber database 102.

The synchronizing of the mobile configuration data may also be performed upon sending a sync request from the mobile station to the network. In another embodiment the network may have a networked-based feature that provides at least one of periodic uploads of the mobile configuration data from the mobile station to the network and periodic downloads of the mobile configuration data from the network to the mobile station. The synchronizing of the mobile configuration data in the network subscriber database with the mobile configuration data in the mobile subscriber database of the mobile station may then be performed automatically upon occurrence of uploading and/or downloading of the mobile configuration data.

Figure 2:
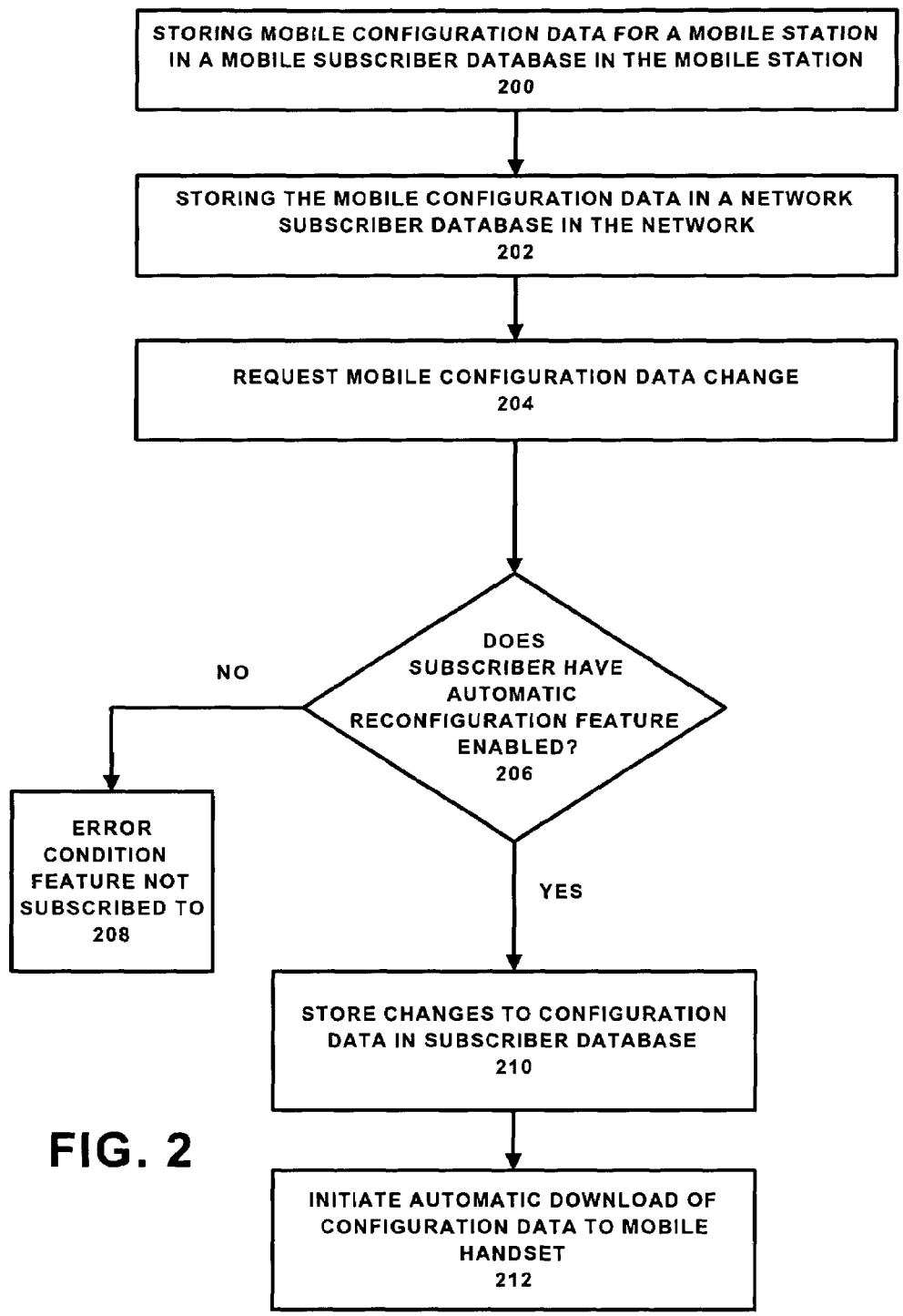
FIG. 2 illustrates a very general flow chart of logical operational steps that may be followed in accordance with one embodiment of the present method.

One embodiment of the system and method is for providing network support for reconfiguration of mobile configuration data for a mobile station. In one embodiment (see FIG. 2) the method may have the steps of: storing mobile configuration data for a mobile station in a mobile subscriber database in the mobile station (step 200); storing the mobile configuration data in a network subscriber database in the network (step 202); sending a mobile configuration data change request to the network (step 204); checking if the subscriber has an automatic reconfiguration feature enabled (step 206); indicating an error condition if the subscriber has not enabled an automatic reconfiguration feature (step 208); changing the mobile configuration data in the network subscriber database (step 210); and synchronizing, in response to the changing of the mobile configuration data in the network subscriber database, the mobile configuration data in the mobile subscriber database with the mobile configuration data in the network subscriber database of the mobile station (step 212).

The user interface may be at least one of: a conversant voice system, a web-based graphical user interface application over the Internet, a computer-based application using a predetermined link to the mobile station, and direct input to the mobile station.

The synchronizing of the mobile configuration data in the mobile subscriber database with the mobile configuration data in the network subscriber database of the mobile station may be performed automatically upon occurrence of the changing of the mobile configuration data in the network subscriber database. In addition, or alternatively, the synchronizing may be performed upon sending a sync request from the mobile station to the network.

Figure 3:
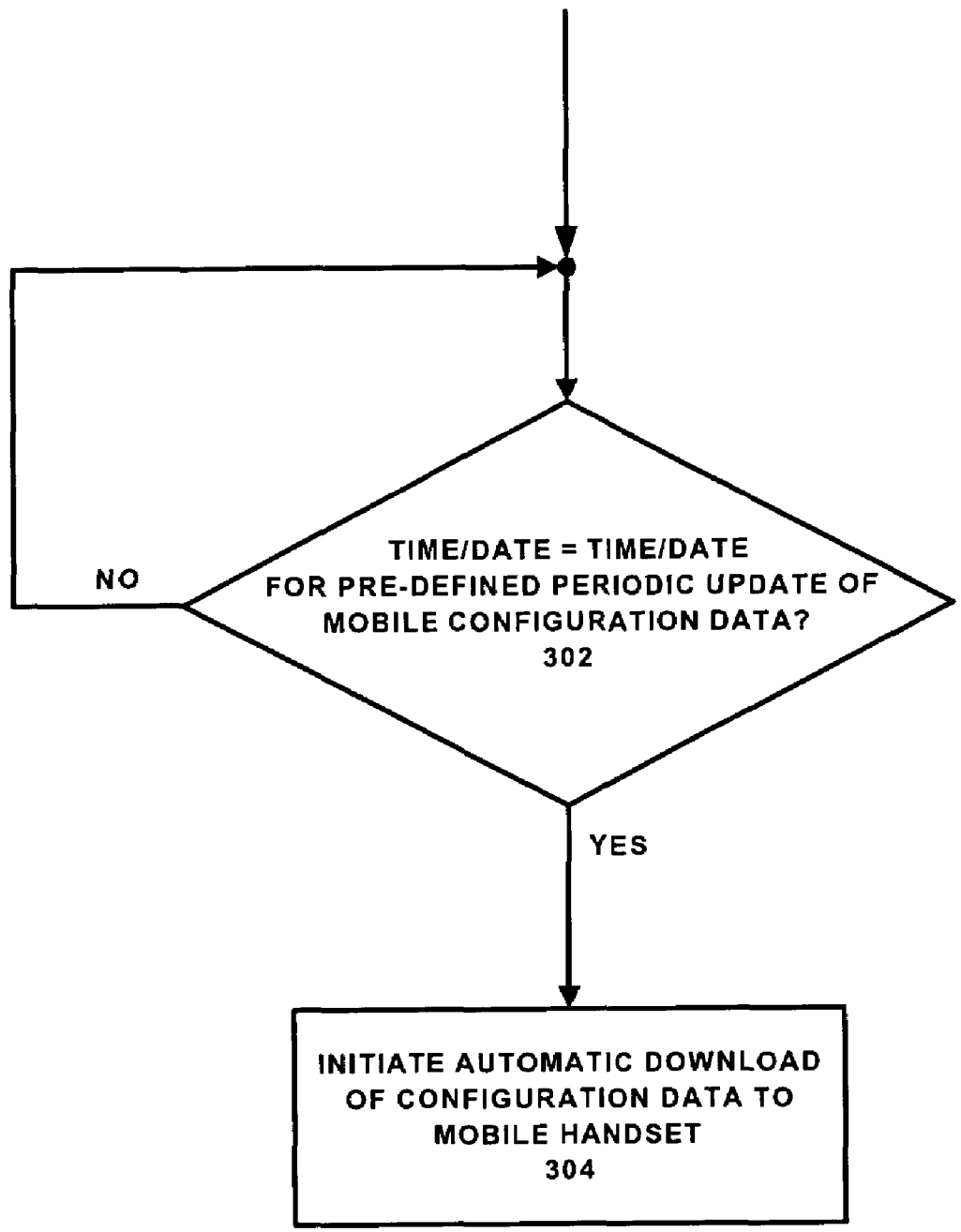
FIG. 3 illustrates another flow chart of logical operational steps that may be followed in accordance with an embodiment of the present method.

In another embodiment (see FIG. 3) there may be periodic uploads of the mobile configuration data from the mobile station to the network and periodic downloads of the mobile configuration data from the network to the mobile station. There may be a pre-defined time/date for updating the mobile configuration data (step 302). The synchronizing in this example may be performed automatically upon occurrence of uploading and/or downloading of the mobile configuration data (step 304).

The mobile configuration data in the network subscriber database is a master copy, and the network is the focus of storage of the mobile configuration data and synchronization events with the mobile station.

In another embodiment of the present invention, mobile configuration data for a mobile station is stored in a mobile subscriber database in the mobile station. The mobile configuration data is also stored in a network subscriber database in the network as a master copy. The mobile configuration data in the network subscriber database may be changed via one user interface of a plurality of user interfaces. The plurality of user interfaces may comprise: a conversant voice system, a web-based graphical user interface application over the Internet, a computer-based application using a predetermined link to the mobile station, and direct input to the mobile station.

In response to the changing of the mobile configuration data in the network subscriber database, the mobile configuration data in the mobile subscriber database is automatically synchronizing with the mobile configuration data in the network subscriber database of the mobile station.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for providing network support for reconfiguration of mobile configuration data for a mobile station, comprising the steps of:

storing mobile configuration data for a mobile station in a mobile subscriber database in the mobile station;

storing the mobile configuration data in a network subscriber database in the network;

changing, directly via the mobile station, the mobile configuration data in the network subscriber database;

synchronizing, in response to the changing of the mobile configuration data in the network subscriber database, the mobile configuration data in the mobile subscriber database with the mobile configuration data in the network subscriber database of the mobile station, such that the changed mobile configuration data is first updated in the network subscriber database and then downloaded to the mobile station where the changes are applied to the mobile configuration data in the mobile subscriber database of the mobile station; and wherein new mobile configuration data is updated in the network subscriber database and then downloaded to the mobile station if the configuration data was updated via user interfaces that are unassociated with the mobile station; and wherein when a PC-based application locally reconfigures data directly on the mobile station, the mobile station then sends the reconfigured data to the network subscriber database for storage.

2. The method according to claim 1, wherein the synchronizing of the mobile configuration data in the mobile subscriber database with the mobile configuration data in the network subscriber database of the mobile station is performed automatically upon occurrence of the changing of the mobile configuration data in the network subscriber database.

3. The method according to claim 1, wherein the synchronizing of the mobile configuration data in the mobile subscriber database with the mobile configuration data in the network subscriber database of the mobile station is performed upon sending a sync request from the mobile station to the network.

4. The method according to claim 1, wherein the network has a networked-based feature that provides at least one of periodic uploads of the mobile configuration data from the mobile station to the network and periodic downloads of the mobile configuration data from the network to the mobile station, and wherein the synchronizing of the mobile configuration data in the mobile subscriber database with the mobile configuration data in the network subscriber database of the mobile station is performed automatically upon occurrence of uploading and/or downloading of the mobile configuration data.

5. The method according to claim 1, wherein the mobile configuration data in the network subscriber database is a master copy.

6. The method according to claim 1, wherein the network is the focus of storage of the mobile configuration data and synchronization events with the mobile station.

7. A method for providing network support for reconfiguration of mobile configuration data for a mobile station, comprising the steps of:
   storing mobile configuration data for a mobile station in a mobile subscriber database in the mobile station;
   storing the mobile configuration data in a network subscriber database in the network;
   changing, directly via the mobile station, the mobile configuration data in the network subscriber database;
   automatically synchronizing, in response to the changing of the mobile configuration data in the network subscriber database, the mobile configuration data in the mobile subscriber database with the mobile configuration data in the network subscriber database of the mobile station, such that the changed mobile configuration data is first updated in the network subscriber database and then downloaded to the mobile station where the changes are applied to the mobile configuration data in the mobile subscriber database of the mobile station;
   wherein the mobile configuration data in the network subscriber database is a master copy; and
   wherein new mobile configuration data is updated in the network subscriber database and then downloaded to the mobile station if the configuration data was updated via user interfaces that are unassociated with the mobile station; and
   wherein when a PC-based application locally reconfigures data directly on the mobile station, the mobile station then sends the reconfigured data to the network subscriber database for storage.

8. The method according to claim 7, wherein the synchronizing of the mobile configuration data in the mobile subscriber database with the mobile configuration data in the network subscriber database of the mobile station is performed upon sending a sync request from the mobile station to the network.

9. The method according to claim 7, wherein the network has a networked-based feature that provides at least one of periodic uploads of the mobile configuration data from the mobile station to the network and periodic downloads of the mobile configuration data from the network to the mobile station, and wherein the synchronizing of the mobile configuration data in the mobile subscriber database with the mobile configuration data in the network subscriber database of the mobile station is performed automatically upon occurrence of uploading and/or downloading of the mobile configuration data.

10. The method according to claim 7, wherein the network is the focus of storage of the mobile configuration data and synchronization events with the mobile station.

11. A system for providing network support for reconfiguration of mobile configuration data for a mobile station, comprising the steps of:
   a mobile subscriber database in a mobile station, and mobile configuration data stored in the a mobile subscriber database in a mobile station;
   a network subscriber database in the network, and a master copy of the mobile configuration data stored in the network subscriber database in the network;
   a user interface operatively connected to the network, the mobile configuration data in the network subscriber database being changeable via the user interface, the user interface being the mobile station;
   a synchronizing system in the network, the synchronizing system effecting, in response to a change of the mobile configuration data in the network subscriber database, a synchronization of the mobile configuration data in the mobile subscriber database with the mobile configuration data in the network subscriber database of the mobile station;
   wherein the mobile configuration data in the network subscriber database is changed directly by the mobile station, the changed mobile configuration data being first updated in the network subscriber database and then downloaded to the mobile station where the changes are applied to the mobile configuration data in the mobile subscriber database of the mobile station; and
   wherein new mobile configuration data is updated in the network subscriber database and then downloaded to the mobile station if the configuration data was updated via user interfaces that are unassociated with the mobile station; and
   wherein when a PC-based application locally reconfigures data directly on the mobile station, the mobile station then sends the reconfigured data to the network subscriber database for storage.

12. The system according to claim 11, wherein the synchronizing of the mobile configuration data in the network subscriber database with the mobile configuration data in the mobile subscriber database of the mobile station is performed automatically upon occurrence of the changing of the mobile configuration data in the network subscriber database.

13. The system according to claim 11, wherein the synchronizing of the mobile configuration data in the network subscriber database with the mobile configuration data in the mobile subscriber database of the mobile station is performed upon sending a sync request from the mobile station to the network.

14. The system according to claim 11, wherein the network has a networked-based feature that provides at least one of periodic uploads of the mobile configuration data from the mobile station to the network and periodic downloads of the mobile configuration data from the network to the mobile station, and wherein the synchronizing of the mobile configuration data in the network subscriber database with the mobile configuration data in the mobile subscriber database of the mobile station is performed automatically upon occurrence of uploading and/or downloading of the mobile configuration data.

* * * * *